3,248,456
POLYMERIZATION OF MONOVINYL AROMATIC HYDROCARBON MONOMERS WITH A MULTI-COMPONENT CATALYST COMPRISING AN ARYLETHYLENE-OXIDE, AN ALPHA-KETOL, A MONOCARBOXYLIC ACID, AND A PEROXIDE
Alva F. Harris, Wilbraham, Mass., assignor to Monsanto Company, a corporation of Delaware
No Drawing. Filed Jan. 17, 1963, Ser. No. 252,027
15 Claims. (Cl. 260—880)

This invention relates to the polymerization of styrene-type monomers and more particularly relates to the use of a novel catalyst system in the polymerization of such monomers.

It is known that styrene-type monomers can be polymerized thermally or catalytically to prepare polymers having molecular weights and residual monomer contents which vary with certain reaction parameters, e.g., the catalyst concentration, the time and temperature of the reaction, etc. It is also known that the product normally has an undesirably high residual monomer content when the parameters of a mass polymerization process are controlled so as to prepare a molding-grade polystyrene, i.e., a polystyrene having a Staudinger average molecular weight in the range of about 40,000–100,000.

As shown in U.S. Patent 2,675,362, certain catalysts make it possible to use a mass polymerization process in preparing molding-grade polystyrene having a residual monomer content as low as 0.35–0.5%, and the product has improved physical and molding properties because of the reduction in residual monomer content. It would obviously be desirable to find a catalyst capable of reducing the residual monomer content to even lower levels without otherwise causing degradation of the product because of (1) the greater improvement in the physical and molding properties of the polymer which could result from the greater reduction in residual monomer content and (2) the decreased likelihood of reaching undesirably high levels with the anomalously higher-than-normal residual monomer contents which are occasionally encountered when styrene-type monomers are mass polymerized on a commercial scale.

An object of the invention is to provide a novel process for polymerizing styrene-type monomers.

Another object is to provide a process for polymerizing styrene-type monomers in the presence of a novel catalyst system.

A further object is to provide a mass process for polymerizing styrene-type monomers to moldable polymers containing a minimum amount of residual monomer.

These and other objects are attained by (1) dissolving a catalytic mixture of an arylethylene oxide, an alpha-ketol, and a monocarboxylic acid having a dissociation constant not higher than $1.0 \times 10^{-4}$ at 25° C. in a polymerizable material comprising a monovinyl aromatic hydrocarbon and/or an ar-halo monovinyl aromatic hydrocarbon and (2) heating to polymerize the polymerizable material.

When desired, the catalyst mixture can also include a monomer-soluble peroxy compound having a half-life of at least 10 hours in benzene at 100° C. This optional ingredient is particularly apt to be desirable when the invention is applied to a mass polymerization process utilizing the time-temperature cycle which is hereinafter defined as the cycle which should be employed when the reaction is intended to produce a moldable polymer having a minimum residual monomer content.

The following examples are given to illustrate the invention and are not intended as a limitation thereof. In the reactions described in these examples (1) quantities mentioned are quantities by weight unless otherwise specified, (2) the monovinyl aromatic monomers employed as starting materials are commercially-supplied monomers containing 0.001–0.0015% t-butyl catechol and varying amounts of the impurities normally present in commercially-supplied styrene-type monomers, and (3) aliquots of the same monomer sample are polymerized in any series of reactions proposed for direct comparison of results.

EXAMPLE I

Part A.—Control

Dissolve 0.04 part of di-t-butyl peroxide and 0.28 part of stearic acid in 100 parts of styrene. Purge the reaction vessel with nitrogen and heat at 90° C. for 24 hours to convert about 32% of the styrene to polymer. Then gradually raise the reaction temperature to 190° C. over a period of 4.75 hours and maintain the temperature at 190° C. for an additional 4 hours. The product has a Staudinger average molecular weight in the range of 40,000–80,000 and a residual monomer content of 1.37%.

Part B.—Control

Repeat Part A except for also dissolving 0.1 part of styrene oxide in the monomer. The product has a Staudinger average molecular weight in the range of 40,000–80,000 and a residual monomer content of 0.62%.

Part C.—Control

Repeat Part A except for also dissolving 0.1 part of alpha-hydroxyacetophenone in the monomer. The product has a Staudinger average molecular weight in the range of 40,000–80,000 and a residual monomer content of 0.40%.

Part D

Prepare nine products by repeating Part A except for also dissolving varying amounts of styrene oxide and alpha-hydroxyacetophenone in the monomer. Each of the products has a Staudinger average molecular weight in the range of 40,000–80,000. The residual monomer contents of the products, together with the amounts of styrene oxide and alpha-hydroxyacetophenone (HAP) employed in their preparation, are shown below.

| Reaction number | Styrene oxide (parts) | HAP (parts) | Residual monomer (percent) |
|---|---|---|---|
| 1 | 0.01 | 0.01 | 0.36 |
| 2 | 0.01 | 0.05 | 0.33 |
| 3 | 0.01 | 0.1 | 0.27 |
| 4 | 0.05 | 0.01 | 0.15 |
| 5 | 0.05 | 0.05 | 0.07 |
| 6 | 0.05 | 0.1 | 0.05 |
| 7 | 0.1 | 0.01 | 0.1 |
| 8 | 0.1 | 0.05 | 0.05 |
| 9 | 0.1 | 0.1 | 0.03 |

As demonstrated in the preceding example, the addition of a mixture of 0.01–0.1 part of styrene oxide and 0.01–0.1 part of alpha-hydroxyacetophenone to a di-t-butyl peroxide/stearic acid catalyst mixture can effect a 73–97% decrease in the residual monomer content of the product. Comparison of the results of Parts B and C with the results of Part D—Reaction 5 shows that the addition of only styrene oxide or only alpha-hydroxyacetophenone to a di-t-butyl peroxide/stearic acid catalyst mixture cannot effect as great a decrease in residual monomer content as the addition of the same total amount of a mixture of styrene oxide and alpha-hydroxyacetophenone. Similar results are observed when Example I is repeated except that:

(1) The time-temperature cycle employed for the reaction is (a) 24 hours at 90° C., followed by 3.5 hours at 90–185° C., followed by 1 hour at 185° C., (b) 24 hours at 90° C., followed by 6.25 hours at 90–185° C., followed by 1.5 hours at 185° C., or (c) 12 hours at 110–90° C., followed by 4.5 hours at 90–190° C., followed by 3 hours at 190° C., (2) The styrene oxide is replaced with o-methylstyrene oxide, p-chlorostyrene oxide, 2,5-dichlorostyrene oxide, or p-t-butylstyrene oxide, (3) The 0.28 part of stearic acid is replaced with 0.4 part of stearic acid, 0.1 part of benzoic acid, or 0.06 part of acetic acid, or (4) The 100 parts of styrene are replaced with 100 parts of p-chlorostyrene, 100 parts of a mixture of o-, m-, and p-methylstyrenes, a mixture of 85 parts of styrene and 15 parts of acrylonitrile, a mixture of 80 parts of styrene and 20 parts of methyl methacrylate, a mixture of 75 parts of styrene and 25 parts of alpha-methylstyrene, or a solution of 10 parts of a rubbery butadiene-styrene (75:25) copolymer in 100 parts of styrene.

EXAMPLE II

Part A.—Control

Dissolve 0.04 part of di-t-butyl peroxide and, respectively, 0.01 part, 0.02 part, 0.1 part, and 0.2 part of a 50:50 mixture of styrene oxide and alpha-hydroxyacetophenone in four 100 part-aliquots of styrene. Purge each of the reaction vessels with nitrogen and heat at 90° C. for 24 hours to convert about 32% of the styrene to polymer. Then gradually raise the reaction temperature to 190° C. over a period of about 4.75 hours and maintain the temperature at 190° C. for an additional 4 hours. Each of the products has a Staudinger average molecular weight in the range of 40,000–80,000. The residual monomer contents of the products, together with the amounts of styrene oxide/alpha-hydroxyacetophenone (SO/HAP) mixture employed in their preparation, are shown below.

| Reaction number | SO/HAP (parts) | Residual monomer (percent) |
| --- | --- | --- |
| 1 | 0.01 | 1.36 |
| 2 | 0.02 | 1.40 |
| 3 | 0.1 | 1.20 |
| 4 | 0.2 | 1.22 |

Part B

Repeat Part A except for also dissolving 0.28 part of stearic acid in each of the aliquots of styrene. Each of the products has a Staudinger average molecular weight in the range of 40,000–80,000. The residual monomer contents of the products, together with the amounts of styrene oxide/alpha-hydroxyacetophenone (SO/HAP) mixture employed in their preparation, are shown below.

| Reaction number | SO/HAP (parts) | Residual monomer (percent) |
| --- | --- | --- |
| 1 | 0.01 | 0.62 |
| 2 | 0.02 | 0.43 |
| 3 | 0.1 | 0.07 |
| 4 | 0.2 | 0.02 |

As demonstrated in Example II, a stearic acid-type compound must be present in order for the arylethylene oxide/alpha-ketol mixtures of the invention to be effective in reducing residual monomer contents.

EXAMPLE III

Dissolve 0.1 part of styrene oxide, 0.1 part of alpha-hydroxyacetophenone, and 0.28 parts of stearic acid in 100 parts of styrene. Purge the reaction vessel with nitrogen and heat at 90° C. for 140 hours. The product has a residual monomer content of 0.58%.

EXAMPLE IV

Dissolve 0.1 part of styrene oxide, 0.1 part of alpha-hydroxyacetophenone, and 0.28 part of stearic acid in 100 parts of styrene. Purge the reaction vessel with nitrogen and heat at 130° C. for 50 hours. The product has a residual monomer content of 0.08%.

EXAMPLE V

Part A.—Control

Dissolve 0.04 part of di-t-butyl peroxide and 0.28 part of stearic acid in 100 parts of styrene. Purge the reaction vessel with nitrogen and heat at 90° C. for 24 hours to convert about 32% of the styrene to polymer. Then gradually raise the reaction temperature to 190° C. over a period of 4.75 hours and maintain the temperature at 190° C. for an additional 4 hours. The product has a Staudinger average molecular weight in the range of 40,000–80,000 and a residual monomer content of 1.12%.

Part B

Prepare eight products by repeating Part A except for also dissolving varying amounts of styrene oxide and acetoin in the monomer. Each of the products has a Staudinger average molecular weight in the range of 40,000–80,000. The residual monomer contents of the products, together with the amounts of styrene oxide and acetoin employed in their preparation, are shown below.

| Reaction number | Styrene oxide (parts) | Acetoin (parts) | Residual monomer (percent) |
| --- | --- | --- | --- |
| 1 | 0.01 | 0.001 | 0.20 |
| 2 | 0.01 | 0.005 | 0.16 |
| 3 | 0.01 | 0.01 | 0.09 |
| 4 | 0.01 | 0.05 | 0.07 |
| 5 | 0.05 | 0.001 | 0.14 |
| 6 | 0.05 | 0.005 | 0.07 |
| 7 | 0.05 | 0.01 | 0.04 |
| 8 | 0.05 | 0.05 | 0.03 |

Part C

Prepare eight products by repeating Part A except for also dissolving varying amounts of styrene oxide and benzoin in the monomer. Each of the products has a Staudinger average molecular weight in the range of 40,000–80,000. The residual monomer contents of the products, together with the amounts of styrene oxide and benzoin employed in their preparation, are shown below.

| Reaction number | Styrene oxide (parts) | Benzoin (parts) | Residual monomer (percent) |
| --- | --- | --- | --- |
| 1 | 0.01 | 0.001 | 0.24 |
| 2 | 0.01 | 0.005 | 0.18 |
| 3 | 0.01 | 0.01 | 0.18 |
| 4 | 0.01 | 0.05 | 0.08 |
| 5 | 0.05 | 0.001 | 0.21 |
| 6 | 0.05 | 0.005 | 0.17 |
| 7 | 0.05 | 0.01 | 0.11 |
| 8 | 0.05 | 0.05 | 0.03 |

The process of the invention comprises (1) dissolving a catalyst mixture consisting of an arylethylene oxide, an alpha-ketol, a weak organic acid, and an optional peroxy compound in a polymerizable material comprising a styrene-type monomer and (2) heating to cause polymerization.

The arylethylene oxide employed in the practice of the invention is a compound corresponding to the formula:

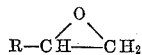

wherein R is an aryl radical, e.g., phenyl, alkylphenyl, halophenyl, naphthyl, alkylnaphthyl, halonaphthyl, biphenyl, etc. Such compounds, when not easily available, can be prepared by the direct oxidation of the corresponding R—CH=CH$_2$ compound with, e.g., perbenzoic acid, or by any other suitable technique. Various methods of preparing alkylene oxides are disclosed, e.g., in Migrdichian, "Organic Synthesis," vol. 1, Reinhold Publishing Corporation, New York (1957), on pages 80–87.

Exemplary of utilizable arylethylene oxides are styrene oxide; ar-alkylstyrene oxides, such as o-, m-, and p-methylstyrene oxides, p-ethylstyrene oxide, p-t-butylstyrene oxide, etc.; ar-halostyrene oxides, such as o-, m-, and p-chlorostyrene oxides, p-bromostyrene oxide, 2,5-dichlorostyrene oxide, 2,4-dichlorostyrene oxide, 2-chloro-4-methylstyrene oxide, etc.; ar-alkoxystyrene oxides, such as p-methoxystyrene oxide, etc.; naphthylethylene oxide; ar-substituted naphthylethylene oxides, such as the ar-chloro and ar-methylnaphthylethylene oxides, etc., and mixtures thereof. Although, as demonstrated, these utilizable compounds can bear a plurality of ar-substituents, arylethylene oxides having ar-substituents in both of the positions ortho to the epoxyethyl group will not ordinarily be found effective in the practice of the invention except when they are used in conjunction with the more reactive arylethylene oxides which are free of substituents in at least one of these ortho positions. Styrene oxide is the preferred arylethylene oxide.

The arylethylene oxide is employed in concentrations of about 0.001–1%, based on the weight of polymerizable material.

The alpha-ketol employed as a catalyst component can be any monomer-soluble compound containing the alpha-ketol grouping, i.e.

and is preferably a compound corresponding to the formula:

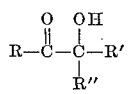

wherein R represents a hydrocarbon radical, R' represents a substituent of the group consisting of hydrogen and a hydrocarbon radical, and R" represents a substituent of the group consisting of hydrogen and a hydrocarbon radical. Suitable alpha-ketols include, e.g., aliphatic alpha-ketols such as hydroxyacetone, acetoin, propionoin, butyroin, isobutyroin, valeroin, hexamethylacetoin, capronoin, 3,8-dimethyldecan-5-one-6-ol, capryloin, nonyloin, caprinoin, 1,21-docosadien-11-one-12-ol, 2,20-docosadiyn-11-one-12-ol, lauroin, myristoin, palmitoin, stearoin, etc.; alicyclic alpha-ketols such as alpha-hydroxycyclohexanone, alpha-hydroxycyclononanone, alpha-hydroxycyclodecanone, alpha-hydroxycyclotetradecanone, etc.; aromatic alpha-ketos such as benzoin, alpha-methylbenzoin, cyclohexoylphenylcarbinol, dodecahydrobenzoin, 2,2'-dichlorobenzoin, 3,3'-dibromobenzoin, 4,4'-diiodobenzoin, 4-chlorobenzoin, 3-methylbenzoin, 2,2'-dimethylbenzoin, 2,4,6-trimethylbenzoin, 4-isopropylbenzoin, naphthabenzoin, 2,2',6,6'-tetramethylbenzoin, alpha-naphthoin, beta-naphthoin, 4,4'-diphenylbenzoin, etc.; and mixtures thereof.

The alpha-ketol is employed in concentrations of about 0.001–0.5%, preferably 0.001–0.03%, based on the weight of polymerizable material. The lower concentrations of alpha-ketol are ordinarily preferred because they permit better control of the reaction rate.

The weak organic acid employed as a catalyst component can be any monocarboxylic acid having a dissociation constant not higher than $1.0 \times 10^{-4}$ at 25° C. Among the particularly suitable acids are acetic, hexanoic, benzoic, phenylacetic, isopropylbenzoic, and hexahydrobenzoic acids and, as a preferred embodiment of the invention, alkanoic acids containing 12–20 carbon atoms (i.e., lauric, tridecanoic, myristic, pentadecanoic, palmitic, margaric, stearic, nonadecanoic, and eicosanic acids). Stearic acid is especially preferred because of the brilliance it imparts to the molded polymers.

The reaction mixture should contain at least 0.05% of the weak organic acid, based on the weight of polymerizable material, and usually contains not more than 1% of the acid. Within the range of 0.05–1% and at higher concentrations, variation in the concentration of a particular acid seems to have no substantial effect on the molecular weights and residual monomer contents of the polymers formed by the reaction, but it is usually preferred to avoid concentrations higher than 1% in order to avoid undue yellowing of the polymer. Ordinarily the reaction mixture will contain 0.1–0.6% of the acid.

The optional component of the catalyst mixture can be any monomer-soluble peroxy compound having a half-life of at least 10 hours in benzene at 100° C. Utilizable peroxy compounds include, e.g., hydrogen peroxide, di-t-butyl diperphthalate, t-butyl peracetate, t-butyl perbenzoate, dicumyl peroxide, di-t-butyl peroxide, 2,5-dimethyl-2,5-di(t-butylperoxy)hexane, 2,5-dimethyl-2,5-di(t-butylperoxy)hexyne-3, t-butyl hydroperoxide, cumene hydroperoxide, p-methane hydroperoxide, cyclopentane hydroperoxide, diisopropylbenzene hydroperoxide, p-t-butyl cumene hydroperoxide, pinane hydroperoxide, 2,5-dimethylhexane-2,5-dihydroperoxide, etc., and mixtures thereof.

The reaction mixture can contain up to 0.1% of the peroxy compound, based on the weight of polymerizable material. This optional component may be found desirable when a substantial amount of the polymerization is to be accomplished at temperatures at which such peroxy compounds are effective, e.g., when the process utilizes the time-temperature cycle hereinafter defined as the cycle to be employed in a mass process when the product is to be a moldable polymer containing a minimum amount of residual monomer. When included as a catalyst component, the peroxy compound is usually employed in concentrations of 0.01–0.1%, preferably 0.01–0.05%.

The catalyst mixtures of the invention are used in the polymerization of polymerizable materials comprising a monovinyl aromatic hydrocarbon and/or an ar-halo monovinyl aromatic hydrocarbon, e.g., styrene; vinyl naphthalene; ar-alkylstyrenes, such as o-, m-, and p-methylstyrense, ar-ethylstyrenes, etc., o-chlorostyrene; p-bromostyrene; 2-chloro-4-methylstyrene, etc., and mixtures thereof. Such monovinyl aromatic monomers, as is well known, normally contain minor amounts of impurities formed as by-products of the monomer synthesis or accumulated during storage. Since the presence of these impurities appears to be more desirable than undesirable in the practice of the invention, they are not removed from the monomers prior to polymerization except when the particular application for which the product of the polymerization is intended requires the removal of one or more particular impurities known to contribute properties which would be undesirable in that application, e.g., excessive amounts of dissolved oxygen are removed when the application will not tolerate the degree of yellowness that would be contributed to the polymer by large amounts of oxygen.

The monovinyl aromatic monomer may constitute the only component of the polymerizable material or may be in admixture with lesser amounts of one or more copolymerizable monomers, such as acrylonitrile; methacrylonitrile; an alkyl methacrylate, e.g., the methyl, ethylpropyl, and butyl methacrylates; the corresponding alkyl acrylates; alpha-alkylstyrenes, e.g., alpha-methylstyrene, alpha-ethylstyrene, alpha-methyl-p-methylstyrene, etc.

When desired, the polymerizable material can have a rubbery conjugated 1,3-diene polymer (e.g., natural rubber, polybutadiene, polyisoprene, copolymers of butadiene and/or isoprene with lesser amounts of comonomers such as styrene, acrylonitrile, methyl methacrylate, etc.) dissolved therein, ordinarily in amounts of 1–25%, based on the weight of polymerizable material. Also, the reaction mixture can contain other optional ingredients such as plasticizers, mineral oils, stabilizers, etc.

The process of the invention is ordinarily conducted at temperatures in the range of about 90–220° C., although the early stages of the polymerization can be conducted at lower temperatures, e.g., 75–90° C., if desired. As will be readily understood, the particular polymerization temperatures which are most desirably employed in the practice of the invention depend on the technique being used (e.g., a mass, suspension, batch, or continuous technique) and the molecular weight desired for the product. Methods of varying polymerization conditions to obtain a particular type of product are, of course, already well known.

A preferred embodiment of the invention is the use of the arylethylene oxide/alpha-ketol/weak organic acid catalyst systems in the mass polymerization of styrene-type monomers to moldable polymers having a minimum residual monomer content. In order for the product of this mass process to have the desired properties, a fairly specific time-temperature cycle should be employed. In the first stage of the reaction, polymerization is conducted at 75–125° C. for about 6–24 hours until 15–45% of the monomer has been converted to polymer; in the second stage, the reaction temperature is gradually raised from 75–95° C. to 180–200° C. over a period of about 3–7 hours; in the final stage, the reaction temperature is maintained at 180–200° C. for about 0.5–5 hours.

The manner of manipulating the reaction temperature during the first stage of the reaction in order to be in the 75–95° C. range for the beginning of the second stage of the reaction is not critical, e.g., an initial temperature of about 100–125° C. can be gradually lowered to 75–95° C. during the first stage of the reaction or the temperature can be maintained at 75–95° C. throughout the first stage of the reaction, etc. According to a particularly preferred embodiment of the invention, the reaction mixture is initially heated to 105–115° C. and maintained at a temperature gradually lowered to about 90° C. until about 25–45% conversion to polymer is obtained, after which the temperature is gradually raised to 180–200° C. over a period of about 3–7 hours and then maintained at 180–200° C. for about 2–5 hours to complete the reaction. Especially good results are also obtained by initially heating the reaction mixture at 90° C. to about 25–35% conversion, then heating at a temperature gradually raised to 180–200° C. over a period of about 4–5 hours, and finally heating at 180–200° C. for 2–4 hours.

Although also generally useful as a new catalytic method of polymerizing styrene-type monomers, the present invention is particularly advantageous in that it permits the formation by a mass process of moldable polystyrene-type materials having lower residual monomer contents than the comparable polymers of the prior art. The reduced residual monomer content improves the physical and molding properties of the polymers.

It is obvious that many variations can be made in the products and processes set forth above without departing from the spirit and scope of this invention.

What is claimed is:

1. A process which comprises (1) dissolving a catalyst mixture consisting of:
   (a) about 0.001–1 part by weight of an arylethylene oxide,
   (b) about 0.001–0.5 part by weight of an alpha-ketol,
   (c) at least 0.05 part by weight of a monocarboxylic acid having a dissociation constant not higher than $1.0 \times 10^{-4}$ at 25° C., and
   (d) up to 0.1 part by weight of a peroxy compound having a half-life of at least 10 hours in benzene at 100° C.

in 100 parts by weight of a polymerizable material comprising a monovinyl aromatic monomer of the group consisting of a monovinyl aromatic hydrocarbon, an ar-halo monovinyl aromatic hydrocarbon, and mixtures thereof and (2) heating to polymerize the polymerizable material.

2. A mass polymerization process which comprises (1) dissolving a catalyst mixture consisting of:
   (a) about 0.001–1 part by weight of an arylethylene oxide,
   (b) about 0.001–0.5 part by weight of an alpha-ketol,
   (c) at least 0.05 part by weight of a monocarboxylic acid having a dissociation constant not higher than $1.0 \times 10^{-4}$ at 25° C., and
   (d) up to 0.1 part by weight of a peroxy compound having a half-life of at least 10 hours in benzene at 100° C.

in 100 parts by weight of a polymerizable material comprising a monovinyl aromatic monomer of the group consisting of a monovinyl aromatic hydrocarbon, an ar-halo monovinyl aromatic hydrocarbon, and mixtures thereof, (2) heating the polymerizable material at 75–125° C. until 15–45% conversion to polymer is obtained, the temperature being so regulated as to be in the 75–95° C. range when this conversion is obtained, (3) gradually raising the reaction temperature to 180–200° C. over a period of about 3–7 hours, and (4) maintaining the reaction temperature at 180–200° C. for about 0.5–5 hours.

3. The process of claim 2 wherein the polymerizable material is styrene.

4. The process of claim 2 wherein the polymerizable material is a mixture of styrene and alpha-methylstyrene.

5. The process of claim 2 wherein the polymerizable material is a mixture of styrene and acrylonitrile.

6. The process of claim 2 wherein the polymerizable material is a mixture of styrene and methyl methacrylate.

7. The process of claim 2 wherein the polymerizable material contains a dissolved rubbery conjugated 1,3-diene polymer.

8. The process of claim 2 wherein the arylethylene oxide is styrene oxide.

9. The process of claim 2 wherein the alpha-ketol is alpha-hydroxyacetophenone.

10. The process of claim 2 wherein the alpha-ketol is acetoin.

11. The process of claim 2 wherein the alpha-ketol is benzoin.

12. The process of claim 2 wherein the monocarboxylic acid is an alkanoic acid containing 12–20 carbon atoms.

13. The process of claim 2 wherein the catalyst mixture consists of (a) 0.001–1 part by weight of an arylethylene oxide, (b) 0.001–0.03 part by weight of an alpha-ketol, and (c) 0.1–0.6 part by weight of a monocarboxylic acid having a dissociation constant not higher than $1.0 \times 10^{-4}$ at 25° C.

14. The process of claim 2 wherein the catalyst mixture consists of (a) 0.001–1 part by weight of an arylethylene oxide, (b) 0.001–0.03 part by weight of an alpha-ketol, (c) 0.1–0.6 part by weight of a monocarboxylic acid having a dissociation constant not higher than $1.0 \times 10^{-4}$ at 25° C., and (d) 0.01–0.1 part by weight of a peroxy compound having a half-life of at least 10 hours in benzene at 100° C.

15. A mass polymerization process which comprises (1) dissolving a catalyst mixture consisting of (a) 0.001–

1 part by weight of styrene oxide, (b) 0.001–0.03 part by weight of benzoin, (c) 0.1–0.6 part by weight of stearic acid, and (d) 0.01–0.05 part by weight of di-t-butyl peroxide in 100 parts by weight of styrene, (2) heating the monomer to 105–115° C. and then gradually lowering the temperature to about 90° C. to obtain 25–45% conversion to polymer, (3) gradually raising the temperature to 180–200° C. over a period of about 3–7 hours, and (4) maintaining the reaction temperature at 180–200° C. for 2–5 hours.

No references cited.

MURRAY TILLMAN, *Primary Examiner.*

P. LIEBERMAN, *Assistant Examiner.*